(12) United States Patent 
Nobuta et al.

(10) Patent No.: US 7,230,069 B2
(45) Date of Patent: Jun. 12, 2007

(54) POLYMERS AND ELECTROCHEMICAL CELL THEREWITH

(75) Inventors: Tomoki Nobuta, Miyagi (JP); Toshihiko Nishiyama, Miyagi (JP); Masaya Mitani, Miyagi (JP); Naoki Takahashi, Miyagi (JP); Tetsuya Yoshinari, Miyagi (JP)

(73) Assignee: NEC Tokin Corporation, Miyagi (JP)

( * ) Notice: Subject to any disclaimer, the term of this patent is extended or adjusted under 35 U.S.C. 154(b) by 171 days.

(21) Appl. No.: 11/042,900

(22) Filed: Jan. 25, 2005

(65) Prior Publication Data

US 2005/0165214 A1 Jul. 28, 2005

(30) Foreign Application Priority Data

Jan. 26, 2004 (JP) ............................. 2004-017011

(51) Int. Cl.
*C08G 73/06* (2006.01)
*C08G 73/18* (2006.01)

(52) U.S. Cl. ...................... 528/422; 528/423; 429/213

(58) Field of Classification Search ................ 528/422, 528/423; 429/213

See application file for complete search history.

(56) References Cited

U.S. PATENT DOCUMENTS 6,720,109 B1    4/2004    Takeuchi et al.
2004/0029003 A1    2/2004    Nobuta et al.

FOREIGN PATENT DOCUMENTS

| JP | 7-320780 | 12/1995 |
| JP | 2000-156329 | 6/2000 |
| JP | 2001-110423 A | 4/2001 |
| JP | 2001-143748 | 5/2001 |
| JP | 2004-127920 | 4/2004 |

*Primary Examiner*—Duc Truong
(74) *Attorney, Agent, or Firm*—Knobbe Martens Olson & Bear, LLP

(57) ABSTRACT

This invention relates to a polymer having a chain structure of a repeating unit of a proton-conducting compound which causes an electrochemical redox reaction in a solution of a proton source to act as an electrode active material, and a heterocyclic compound structure; and an electrochemical cell comprising the polymer as an electrode active material.

33 Claims, 4 Drawing Sheets

F I G. 4
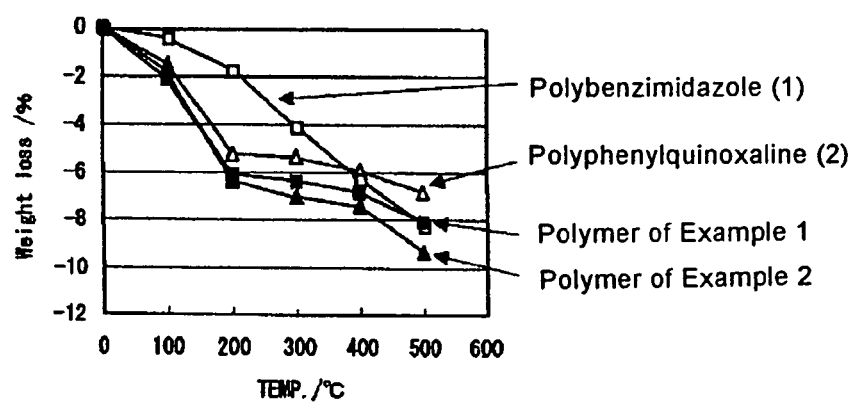

POLYMERS AND ELECTROCHEMICAL CELL THEREWITH

BACKGROUND OF THE INVENTION

1. Field of the Invention

This invention relates to a conductive polymer used for an electrode material in an electrochemical cell such as a secondary battery, an electric double-layer capacitor, a redox capacitor and a condenser, as well as an electrochemical cell therewith. In particular, it relates to an electrode material whereby charge/discharge cycle properties can be improved without deterioration in an apparent capacity or input/output properties, and an electrochemical cell therewith.

2. Description of the Related Art

There have been suggested and practically used secondary batteries, electric double-layer capacitors, redox capacitors and condensers in which a proton-conducting compound is used as an electrode active material. FIG. 1 is a schematic cross-sectional view showing a typical example of such an electrochemical cell.

The electrochemical cell shown in FIG. 1 has a configuration where a cathode 2 and an anode 3 containing a proton-conducting compound as an active material are formed on a cathodic collector 1 and an anodic collector 4, respectively, these electrodes are combined via a separator 5 and only protons are involved as a charge carrier. The cell is filled with an aqueous or non-aqueous solution containing a proton-donating electrolyte after ionization, i.e., a proton source, as an electrolytic solution, and is sealed by a gasket 6.

The cathode 2 and the anode 3 can be prepared using an electrode material containing a doped or undoped proton-conducting compound powder, a conduction auxiliary and a binder. These electrodes can be formed by a method comprising the steps of placing the electrode material in a mold with a predetermined size and molding it by a hot press to form a solid electrode, or a method comprising the steps of depositing an electrode material slurry on a conductive substrate by screen printing and drying the resulting film to form an electrode. Then, a cathode 2 and an anode 3 thus formed can be mutually faced via a separator 5 to give an electrochemical cell.

Examples of a proton-conducting compound used as an electrode active material include π-conjugated polymers such as polyaniline, polythiophene, polypyrrole, polyacetylene, poly-p-phenylene, polyphenylene-vinylene, polyperinaphthalene, polyfuran, polyflurane, polythienylene, poly-pyridinediyl, polyisothianaphthene, polyquinoxaline, polypyridine, polypyrimidine, polyindole, polyaminoanthraquinone, polyimidazole and their derivatives; indole π-conjugated compound such as an indole trimer compound; quinones such as benzoquinone, naphthoquinone and anthraquinone; quinone polymers such as polyanthraquinone, polynaphthoquinone and polybenzoquinone where a quinone oxygen can be converted into a hydroxyl group by conjugation); and proton-conducting polymer prepared by copolymerizing two or more of the monomers giving the above polymers. These compounds may be doped to form a redox pair for exhibiting conductivity. These compounds are appropriately selected as a cathode and an anode active material, taking a redox potential difference into account.

Known electrolytic solutions include an aqueous electrolytic solution consisting of an aqueous acid solution and a non-aqueous electrolytic solution comprising an electrolyte in an organic solvent. The former aqueous electrolytic solution is exclusively used because it can give a high-capacity cell. The acid used may be an organic or inorganic acid; for example, inorganic acids such as sulfuric acid, nitric acid, hydrochloric acid, phosphoric acid, tetrafluoroboric acid, hexafluorophosphoric acid and hexafluorosilicic acid and organic acids such as saturated monocarboxylic acids, aliphatic carboxylic acids, oxycarboxylic acids, p-toluenesulfonic acid, polyvinylsulfonic acid and lauric acid.

Japanese Laid-open Patent Publication Nos. 2000-156329, 2001-143748 and 1995-320780 have disclosed specific examples of an electrolytic solution and an electrolyte used in a common electrochemical cell.

Japanese Laid-open Patent Publication No. 2000-156329 has disclosed an electrolytic solution for an aluminum electrolytic condenser comprising a quaternary salt formed from a quaternary cation of a compound having an N,N,N'-substituted amidine group and an organic acid anion as a solute. Examples of a compound having an N,N,N'-substituted amidine group include cyclic amidines having an imidazole ring, a 2-imidazoline ring or a tetrahydropyrimidine ring. Examples of an organic acid cation include those of carboxylic acids, and mono and dialkyl phosphates. Furthermore, it has been described that the electrolytic solution can improve heat resistance, increases a specific conductance, improves durability and minimize deterioration of a sealer.

Japanese Laid-open Patent Publication No. 2001-143748 has disclosed a non-aqueous electrolytic solution for a lithium secondary battery containing a lithium salt of a perfluoroalkylsulfonic acid derivative and a heterocyclic compound having at least one fluorine atom and nitrogen or oxygen. Examples of the heterocyclic compound include pyrazoles, imidazoles, triazoles, oxazoles and coumarins. It has also described that in the electrolytic solution, the heterocyclic compound can prevent a cathode collector from being oxidatively deteriorated and improve charge/discharge cycle properties.

Japanese Laid-open Patent Publication No. 7-320780 has disclosed the use of polyamides, polyimidazoles, polyimides, polyoxazoles, polytetrafluoroethyele, polymelamine formaldehyde, polycarbonates and polypropylene as an electrolyte for a solid electrolyte secondary battery. It has also described that using the polymer can prevent the electrolyte from reacting an anode and improve charge/discharge cycle properties.

We have filed Japanese Patent Application No. 2003-198660 (Japanese Laid-open Patent Publication No. 2004-127920) disclosing that a nitrogen-containing heterocyclic compound or a polymer comprising a unit having a nitrogen-containing heterocycle structure is used as an electrode active material for preventing an electrode active material from being deteriorated by over-oxidation or over-reduction and for improving charge/discharge cycle properties of a secondary battery. Examples of these compounds described includes imidazole, triazole, pyrazole and their derivatives, and polymers comprising a unit having any of these structures.

The invention disclosed in Japanese Laid-open Patent Publication No. 2004-127920 is based on the observation that a nitrogen-containing heterocyclic compound incorporated in an electrode material can prevent an electrode active material from being deteriorated by over-oxidation or over-reduction. In other words, in this technique, a nitrogen-containing heterocyclic compound is added to and mixed with an electrode or a polymer having a structure of a nitrogen-containing heterocyclic compound, specifically a copolymer having an imidazole moiety is used as a material for an electrode, in order to improve charge/discharge cycle properties of a secondary battery.

Further specific examples are a polyphenylquinoxaline represented by formula (13) as a comparative example, and a copolymer of benzimidazole and phenylquinoxaline represented by formula (14), which act as an active material. In the copolymer represented by formula (14), as a content of the structural unit of the nitrogen-containing heterocyclic compound increases, charge/discharge cycle properties are improved while an electron conductivity is reduced, in comparison with the polymer represented by formula (13).

In particular, when the structural unit of the nitrogen-containing heterocyclic compound is 50 wt % or more to the structural unit of the polyphenylquinoxaline, the content is so high that an electron conductivity is significantly reduced and a reaction resistance with ions in an electrolytic solution is increased, leading to deterioration in charge/discharge cycle properties.

For example, the phenylquinoxaline-benzimidazole copolymer represented by formula (14) has a structure where a benzimidazole moiety is introduced in the polyphenylquinoxaline framework with good electron conductivity because of its long π-conjugated system and thus breaks the conjugated system. Specifically, in comparison with the polyphenylquinoxaline (formula 13), formation of a conduction path for electrons is hindered, resulting in a reduced electron conductivity of the copolymer (formula 14).

In theory, an electron conductivity is significantly influenced by a length of a π-conjugated system and a density of a carrier for electrons. Thus, it is believed that introduction of a benzimidazole moiety into a polymer may reduce an electron conductivity because a longer π-conjugated system and a higher carrier density give a higher conductivity.

Therefore, an electron conductivity of a copolymer having such a chemical structure is significantly influenced by a weight ratio of a structural unit having an imidazole

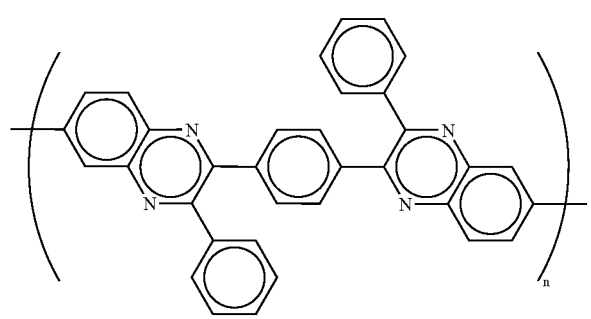

(13)

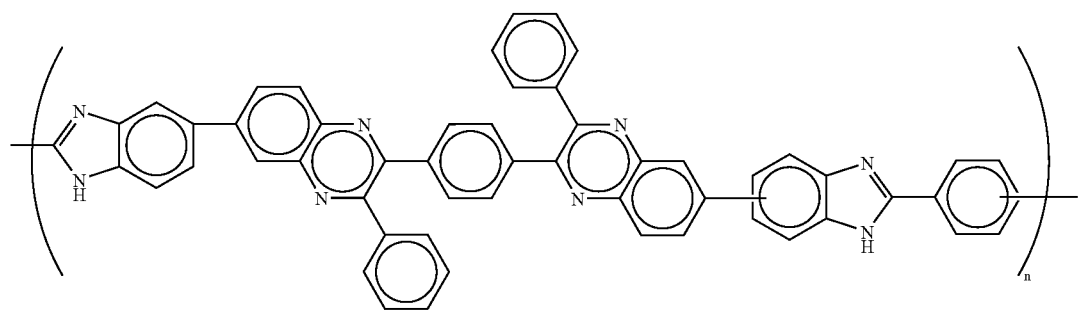

(14)

This problem would be due to the chemical structure of the polymer, probably the following reasons. The chemical structure of the copolymer represented by formula (14) is a structure where the framework of the polymer main chain is a random polymer structure of the phenylquinoxaline structural unit and the benzimidazole structural unit, in which as a chemical composition, only a weight ratio of the phenylquinoxaline structural unit to the benzimidazole structural unit is controlled. In other words, regularity of an alignment of the structural units is not controlled in terms of a chemical structure.

Such a copolymer in which regularity of an alignment of the structural units is not controlled has a structure where two different structural units are randomly arranged, so that in comparison with a conventional polymer having one structural unit, i.e., a homopolymer, regularity in a chemical structure is reduced and formation of a conduction path for electrons is hindered, leading to tendency to considerable reduction in an electron conductivity.

moiety; as the weight ratio increases, an electron conductivity is significantly reduced.

Furthermore, an electrochemical cell using such a copolymer as an electrode material has an increased internal resistance, leading to a reduced energy and deterioration in quick charge/discharge properties, and, when a content of the structural unit of the nitrogen-containing heterocyclic compound is excessive, deterioration in charge/discharge cycle properties.

SUMMARY OF THE INVENTION

An objective of this invention is to prevent reduction in an electron conductivity in a proton-conductive polymer having a structural unit of a heterocyclic compound. Another objective of this invention is to improve charge/discharge cycle properties while preventing energy reduction or deterioration in quick charge/discharge properties in an electrochemical cell comprising such a polymer as an electrode active material.

This invention relates to a polymer having a proton-conducting compound skeleton and a heterocyclic compound skeleton, as well as an electrochemical cell using the polymer as an electrode active material. In view of the above problems, this invention has been achieved by intense investigation for providing a polymer exhibiting a good electron conductivity by controlling the chemical structure of the polymer, particularly an alignment of structural units, and providing an electrochemical cell having improved charge/discharge cycle properties without deterioration in energy properties or quick charge/discharge properties, by using the polymer.

According to an aspect of this invention, there is provided a polymer having a chain structure of a repeating unit of a proton-conducting compound which causes an electrochemical redox reaction in a solution of a proton source to act as an electrode active material, and a heterocyclic compound structure.

According to another aspect of this invention, there is provided the polymer as described above, wherein the polymer is a block copolymer having a polymer unit of the proton-conducting compound and a polymer unit of the heterocyclic compound.

According to another aspect of this invention, there is provided the polymer as described above, wherein the polymer comprises a main polymer having a polymer unit of the proton-conducting compound and the heterocyclic compound attached to the main polymer or a side chain comprising the heterocyclic compound structure.

According to another aspect of this invention, there is provided the polymer as described above, wherein the polymer comprises a main polymer consisting of the block copolymer and the heterocyclic compound attached to the main polymer or a side chain comprising the heterocyclic compound structure.

According to another aspect of this invention, there is provided the polymer as described above, wherein the polymer comprises a polymer unit having a chain structure of the proton-conducting compound, and a copolymer unit having the proton-conducting compound structure and the heterocyclic compound structure.

According to another aspect of this invention, there is provided the polymer as described above, wherein a number average molecular weight of the polymer unit of the proton-conducting compound is larger than a number average molecular weight of the polymer unit of the heterocyclic compound.

According to another aspect of this invention, there is provided the polymer as described above, wherein a content ratio by weight of the structural unit of the heterocyclic compound is 1 to 95 parts by weight to 100 parts by weight of the structural unit of the proton-conducting compound.

According to another aspect of this invention, there is provided the polymer as described above, wherein the chain structure of the proton-conducting compound has a quinoxaline structure represented by formula (1):

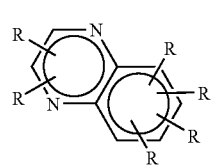

(1)

wherein at least one of Rs is a group attached to the main chain or a side chain of the polymer, or two of Rs are groups constituting the main chain, and the other Rs are independently selected from the group consisting of hydrogen, hydroxyl, amino, carboxyl, nitro, phenyl, vinyl, halogen, acyl, cyano, trifluoromethyl, alkoxyl, sulfonic, trifluoromethylthio, carboxylate, sulfonate, $C_1$ to $C_{20}$ alkyl optionally substituted with one or more of the above substituents, $C_2$ to $C_{20}$ alkenyl optionally substituted with one or more of the above substituents, $C_6$ to $C_{20}$ aryl optionally substituted with one or more of the above substituents, $C_1$ to $C_{20}$ alkylthio optionally substituted with one or more of the above substituents and a heterocyclic compound residue. As used herein, the term "independently" means that all of Rs may be one of the above substituents or individual Rs may be different substituents.

According to another aspect of this invention, there is provided the polymer as described above, having, as the chain structure of the proton-conducting compound, a chain of a quinoxaline structural unit represented by formula (1A):

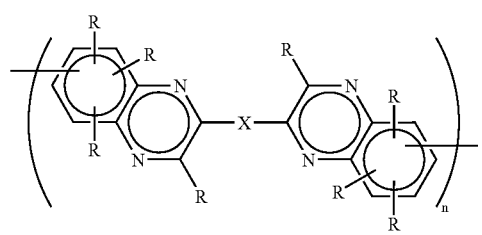

(1A)

wherein Rs independently represent hydrogen, hydroxyl, amino, carboxyl, nitro, phenyl, vinyl, halogen, acyl, cyano, trifluoromethyl, alkoxyl, sulfonic, trifluoromethylthio, carboxylate, sulfonate, $C_1$ to $C_{20}$ alkyl optionally substituted with one or more of the above substituents, $C_2$ to $C_{20}$ alkenyl optionally substituted with one or more of the above substituents, $C_6$ to $C_{20}$ aryl optionally substituted with one or more of the above substituents, $C_1$ to $C_{20}$ alkylthio optionally substituted with one or more of the above substituents and a heterocyclic compound residue; and X represents arylene optionally substituted with one or more of the above substituents.

According to another aspect of this invention, there is provided the polymer as described above, having, as the heterocyclic compound structure, a structure of a compound represented by formula (2) or (3):

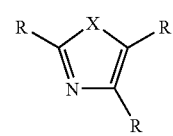

(2)

-continued

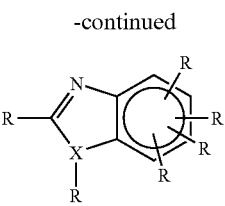

(3)

wherein at least one of Rs is a group attached to the main chain or a side chain of the polymer, or two of Rs are groups constituting the main chain, and the other Rs are independently selected from the group consisting of hydrogen, hydroxyl, amino, carboxyl, nitro, phenyl, vinyl, halogen, acyl, cyano, trifluoromethyl, alkoxyl, sulfonic, trifluoromethylthio, carboxylate, sulfonate, $C_1$ to $C_{20}$ alkyl optionally substituted with one or more of the above substituents, $C_2$ to $C_{20}$ alkenyl optionally substituted with one or more of the above substituents, $C_6$ to $C_{20}$ aryl optionally substituted with one or more of the above substituents, $C_1$ to $C_{20}$ alkylthio optionally substituted with one or more of the above substituents and a heterocyclic compound residue; and X is a heteroatom selected from the group consisting of nitrogen, sulfur and oxygen.

According to another aspect of this invention, there is provided the polymer as described above, wherein the heterocyclic compound structure is a structure of at least one compound selected from the group consisting of an imidazole represented by formula (4), a triazole represented by formula (5) or (6) and a pyrazole represented by formula (7):

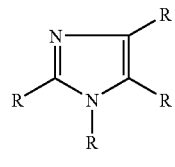

(4)

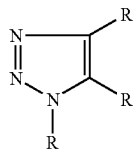

(5)

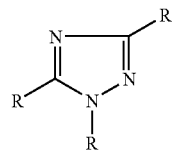

(6)

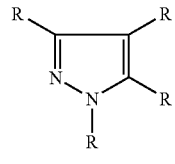

(7)

wherein at least one of Rs is a group attached to the main chain or a side chain of the polymer, or two of Rs are groups constituting the main chain, and the other Rs are independently selected from the group consisting of hydrogen, hydroxyl, amino, carboxyl, nitro, phenyl, vinyl, halogen, acyl, cyano, trifluoromethyl, alkoxyl, sulfonic, trifluoromethylthio, carboxylate, sulfonate, $C_1$ to $C_{20}$ alkyl optionally substituted with one or more of the above substituents, $C_2$ to $C_{20}$ alkenyl optionally substituted with one or more of the above substituents, $C_6$ to $C_{20}$ aryl optionally substituted with one or more of the above substituents, $C_1$ to $C_{20}$ alkylthio optionally substituted with one or more of the above substituents and a heterocyclic compound residue.

According to another aspect of this invention, there is provided the polymer as described above, wherein the heterocyclic compound structure is at least one selected from the group consisting of a unit having a benzimidazole moiety represented by formula (8), (9) or (10), a unit having a benzbisimidazole moiety represented by formula (11), and a unit having a vinylimidazole moiety represented by formula (12) or its derivative.

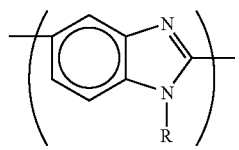

(8)

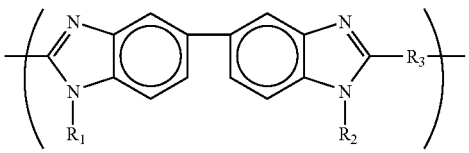

(9)

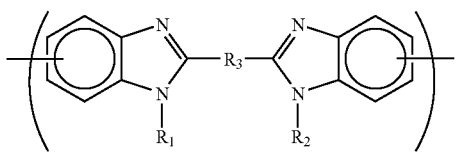

(10)

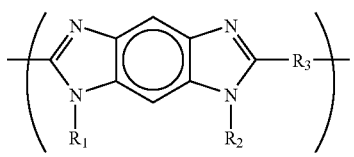

(11)

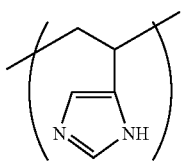

(12)

wherein R, $R_1$ and $R_2$ independently represent hydrogen, hydroxyl, amino, carboxyl, nitro, phenyl, vinyl, halogen, acyl, cyano, trifluoromethyl, alkoxyl, sulfonic, trifluoromethylthio, carboxylate, sulfonate, $C_1$ to $C_{20}$ alkyl optionally substituted with one or more of the above substituents, $C_2$ to $C_{20}$ alkenyl optionally substituted with one or more of the above substituents, $C_6$ to $C_{20}$ aryl optionally substituted with one or more of the above substituents, $C_1$ to $C_{20}$ alkylthio optionally substituted with one or more of the above substituents and a heterocyclic compound residue; and $R_3$ represents an arylene optionally substituted with one or more of the above substituents.

This invention also provides an electrode comprising the polymer as described above as an electrode active material.

This invention also provides an electrochemical cell comprising the polymer as described above as an electrode active material.

This invention also provides the electrochemical cell as described above comprising an electrolyte containing a proton source, wherein only protons act as a charge carrier in a redox reaction in association with charge/discharge.

The term "electrochemical cell" as used herein refers to a class of device comprising a proton-conducting compound as an electrode active material, such as a secondary battery, an electric double layer capacitor, a redox capacitor and a condenser.

For R, $R_1$ and $R_2$ in the above formulas, more specifically, halogen includes fluorine, chlorine, bromine and iodine; alkyl includes methyl, ethyl, propyl, isopropyl, n-butyl, s-butyl, isobutyl, t-butyl, n-pentyl, n-hexyl, n-heptyl, and n-octyl; acyl includes —COX where X is the alkyl above; alkoxyl includes —OX where X is the alkyl above. Caboxylate and sulfonate include those where an alkyl moiety is the alkyl above. Alkenyl includes vinyl, 2-propenyl (allyl), 1,3-butadienyl and 4-methoxy-2-butenyl. Aryl includes phenyl, naphthyl and anthryl. Alkylthio includes those where an alkyl moiety is the alkyl above. A heterocyclic compound residue includes 3- to 10-membered rings having 2 to 20 carbon atoms and 1 to 5 heteroatoms. A heteroatom includes oxygen, sulfur and nitrogen. $R_3$ in the formulas above includes phenylene and naphthylene. X in formula (1A) includes phenylene and naphthylene optionally substituted with one or more of the above substituents.

The polymer of this invention is characterized in that a chemical structure is controlled in copolymerization of a structural unit of a proton-conducting compound which acts as an electrode active material, and a structural unit of a heterocyclic compound. The chemical structure has a chain structure where repeating units of the proton-conducting compound are sequentially bound and aligned. More specifically, it is characterized in that a block copolymer structure comprising a polymer unit of a proton-conducting compound which acts as an electrode active material and a polymer unit of a heterocyclic compound, or in that a heterocyclic compound alone or a side chain having a plurality of the heterocyclic compound units is attached to a conductive polymer consisting of a proton-conducting compound acting as an electrode active material, or to a conductive polymer having a chain structural unit of the proton-conducting compound and a unit of a heterocyclic compound.

In such a polymer in which a chemical structure is controlled, a π-conjugated system structure in a homopolymer as an electrode active material is maintained to prevent the conjugated system from being disrupted after introducing a heterocyclic compound. Thus, there may be provided polymer exhibiting good electric properties without deterioration in a conventional electron conductivity in a homopolymer acting as an electrode active material.

In addition to the effects, an electrochemical cell comprising the polymer of this invention as an electrode active material in an electrode material has a lower internal resistance, so that charge/discharge cycle properties can be improved without deterioration in energy properties or quick charge/discharge properties.

Furthermore, although simply increasing a content of a heterocyclic compound structure in the polymer may lead to significant reduction in an electron conductivity, this invention can prevent such reduction so that improvement in charge/discharge cycle properties by the heterocyclic compound can be maximized.

BRIEF DESCRIPTION OF THE DRAWINGS

FIG. 4 shows the TG measurement results.

DESCRIPTION OF THE PREFERRED EMBODIMENTS

Figure 1:
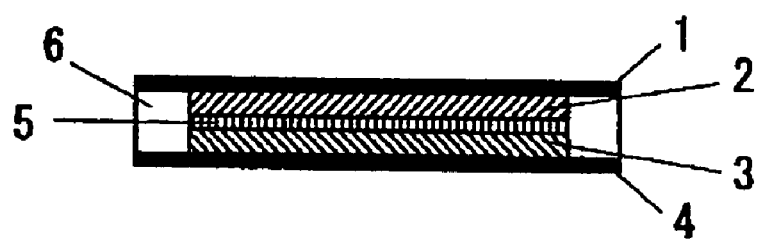
FIG. 1 is a cross-sectional view showing a typical example of an electrochemical cell.

The polymer of this invention comprises a proton-conductive compound structure and a heterocyclic compound structure, and can be subjected to an electrochemical redox reaction in a solution of a proton source to act as an electrode active material.

Particularly, the polymer of this invention comprises, as a proton-conductive compound structure, a chain structure (chain unit) where repeating units of the proton-conductive compound are sequentially bound and aligned. Thus, it has a heterocyclic compound structure which can prevent the electrode active material from deterioration due to over-oxidation or over-reduction, while having an adequate electron conductivity. Therefore, when using the polymer as an electrode active material in an electrochemical cell, good charge/discharge cycle properties can be achieved while preventing deterioration in energy properties and quick charge/discharge properties.

The polymer of this invention may have one of the following structures:

(a) a block copolymer structure having a chain unit of a proton-conducting compound (homopolymer unit) and a chain unit of a heterocyclic compound (homopolymer unit);

(b) a structure having a chain unit of a proton-conducting compound and a copolymer unit comprising a proton-conductive compound structure and a heterocyclic compound structure;

(c) a graft structure comprising a main polymer having a chain unit of a proton-conducting compound, and a heterocyclic compound attached to the main polymer or a side chain (branched chain) having a heterocyclic compound structure;

(d) a graft structure comprising the main polymer in (a) or (b), and a heterocyclic compound attached to the main polymer or a side chain (branched chain) having a heterocyclic compound structure.

The term, "chain unit", i.e., "homopolymer unit" as used herein refers to a chain unit where one type of repeating units are sequentially bound and aligned. The term "copolymer unit" as used herein refers to a polymer unit where multiple types of repeating units are bound and aligned as appropriate. The term "graft structure" used herein include a structure where one repeating unit is present in a branched chain. The term "homopolymer" as used in the following description refers to a chain polymer where one type of repeating unit is sequentially bound and aligned, and the term "copolymer" refers to a polymer where multiple types of repeating units are bound and aligned as appropriate.

The polymer of this invention preferably comprises the quinoxaline structure represented by formula (1) in a repeating unit of a proton-conducting compound. The quinoxaline structure may be a structure partly attached to a main chain or side chain, but in the light of desired properties such as an electron conductivity, it is preferably a structure comprising a quinoxaline structure as a part of the main chain as shown in formula (1B). Specifically, the repeating unit is preferably a repeating unit represented by formula (1A). R in formula (1B) is as defined in formula (1), except that two Rs constitute the main chain in formula (1).

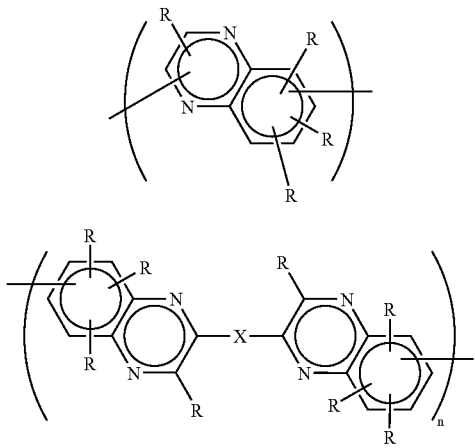

A cell electrode used in an electrochemical cell of this invention may comprise a proton-conducting compound as an electrode active material in an electrode material, a conduction auxiliary and if necessary a binder.

As the electrode active material, a polymer of this invention comprising a polyphenylquinoxaline framework represented by formula (13) (a repeating unit chain) and a heterocyclic compound structure represented by one of formulas (15) to (18) will be detailed.

In formulas (15) to (18), Ars independently represent an aromatic compound or its derivative such as phenyl, biphenyl, naphthalene, diphenylmethane, diphenylsulfone and diphenylsulfide, whose aromatic ring herein forms a fused ring; and R' is an appropriate binding site in a polymer unit. $R_1$ and $R_2$ independently represent hydrogen, hydroxy, amino, carboxyl, nitro, phenyl, vinyl, halogen, acyl, cyano, trifluoromethyl, alkoxyl, sulfonic, trifluoromethylthio, carboxylic, carboxylate, sulfonate, $C_1$ to $C_{20}$ alkyl optionally substituted with one or more of the above substituents, $C_2$ to $C_{20}$ alkenyl optionally substituted with one or more of the above substituents, $C_6$ to $C_{20}$ aryl optionally substituted with one or more of the above substituents, $C_1$ to $C_{20}$ alkylthio optionally substituted with one or more of the above substituents and a heterocyclic compound residue. $R_3$s independently represent arylene optionally substituted with one or more of the above substituents and $C_1$ to $C_6$ alkylene optionally substituted with one or more of the above substituents. Ys independently represent a structural unit of a heterocyclic compound represented by any of formulas (2) to (12).

A quinoxaline polymer can be prepared by polymerization utilizing a dehydration-condensation reaction in an organic solvent using an aromatic tetraamino compound represented by formula (19) and a tetracarbonyl compound represented by formula (20) as starting materials according to a well-known process (see, J. Polymer Science, Vol. 5, p. 1453, 1967). Ar in formula (19) and $R_1$, $R_2$ and $R_3$ in formula (20)

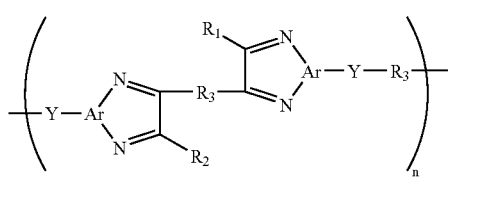

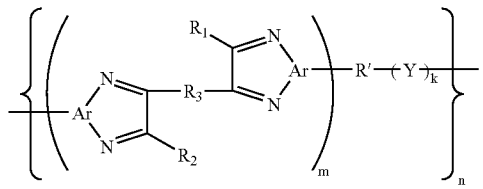

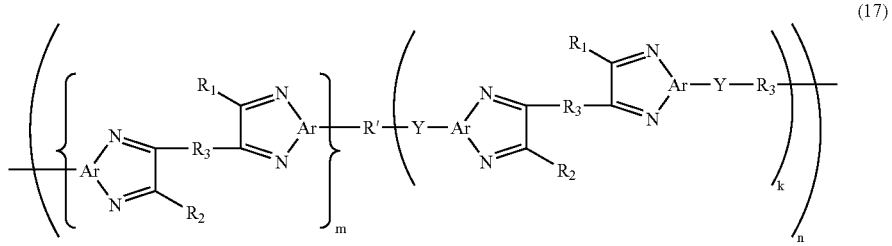

are as defined above; for example, Ar is biphenyl; $R_1$ and $R_2$ are phenyl; and $R_3$ is p-phenylene.

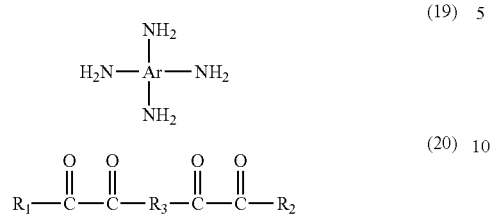

A heterocyclic compound such as an imidazole and an oxazole can be synthesized by known processes such as Bredereck synthesis as shown in formula (21).

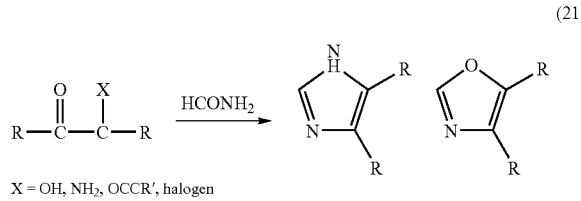

A polybenzimidazole can be also prepared by a known process shown in formula (22).

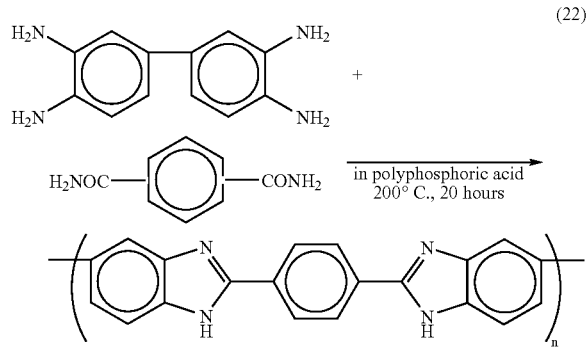

The starting materials for these heterocyclic compounds and the compounds represented by formulas (19) and (20) as starting materials for the quinoxaline polymer can be appropriately reacted to provide a copolymer consisting of a heterocyclic compound and quinoxaline compound represented by formula (15).

Specifically, for preparing a copolymer of quinoxaline and benzimidazole represented by formula (15) (for example, a polymer represented by formula (14)), a tetraamine compound represented by formula (19) (for example, 3,3'-diaminobenzidine wherein Ar is biphenyl), a compound represented by formula (20) (for example, $R_1$ and $R_2$ are phenyl; and $R_3$ is p-phenylene) and an aromatic dicarbonyl compound represented by formula (23), (24) or (25) can be polymerized by utilizing a dehydrating condensation polymerization in an organic solvent such as N,N-dimethylformamide (hereinafter, referred to as "DMF") at an appropriate temperature according to a well-known polymerization process for a quinoxaline polymer.

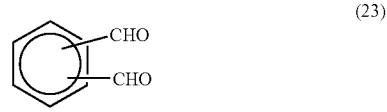

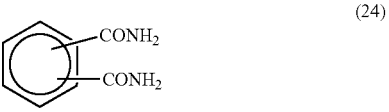

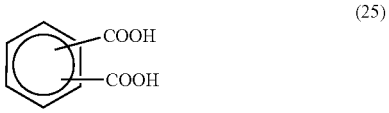

A temperature is not particularly limited, but it is generally about a refluxing temperature of a solvent used. A reaction temperature is not particularly limited either. Although it depends on the types of compounds used and a solvent, polymerization is preferably conducted for at least about 10 hours because the reaction is dehydrating condensation polymerization. A solvent used may be any solvent capable to dissolve starting compounds and inert to the compounds without limitations.

The copolymer represented by formula (16) can be prepared by preparing a plurality of homopolymers having an appropriate molecular weight, activating an end group in each homopolymer, and then treating the mixture with a certain compound capable of binding the activated polymer ends together to form a block copolymer. Thus, there can be prepared a block copolymer consisting of a two or more component (two or more blocks) polymer unit comprising a chain unit of a proton-conducting compound and a chain unit of a heterocyclic compound without a branched structure. The process may be repeated to prepare a copolymer having an appropriate molecular weight and an appropriate polymer unit number (block number).

A block copolymer without a branched structure as described above may be prepared by an alternative process; for example, a process comprising initiating polymerization of a monomer at the end of a homopolymer by adding a radical initiator or a polymerization initiator such as a nickel salt to form a new polymer unit, or a process comprising polymerizing one homopolymer to be copolymerized in a solution of the other homopolymer prepared in a solvent. It should be noted that in a radical polymerization, structure controllability may be reduced due to a chain transfer reaction.

The copolymer represented by formula (17) may be also prepared by preparing polymers constituting individual polymer units (block units) and then conducting polymerization as described for preparation of the block copolymer represented by formula (16). Thus, there can be prepared a block copolymer comprising a homopolymer unit of a proton-conducting compound and a copolymer unit having a proton-conductive compound structure and a heterocyclic compound structure.

The polymer represented by formula (18) can be prepared by polymerization utilizing a condensation reaction of a tetracarbonyl compound represented by formula (20) and an aromatic tetraamine compound represented by formula (19) in an organic solvent.

For example, an aromatic tetracarbonyl compound having 2-phenylimidazole in its end (for example, in formula (20), $R_3$ is phenylene; and $R_1$ and $R_2$ are 2-phenylimidazole) and an aromatic tetraamine compound (for example, 3,3'-diaminobenzidine) may be polymerized by a known polymerization process for a polyquinoxaline to give a graft polymer (for example, formula (28)) having a branched structure in which an imidazole moiety is introduced in a side chain to the main chain of the quinoxaline framework.

Thus, a tetracarbonyl compound having an imidazole moiety in its end represented by formula (20) and a tetraamine compound represented by formula (19) can be polymerized by a known polymerization process for a polyquinoxaline to give a graft copolymer having a branched structure.

Furthermore, the synthetic methods for the above polymers represented by formulas (15) to (18) can be combined to provide a copolymer having a structure comprising both block and graft structures in the polymer backbone. In formulas (15) to (18), n, m, k, I and h represent integers of 1 or more. It is preferable that m is a polymerization degree larger than k. When one of I and h is 1 or more, the other may be zero.

A composition of structural units constituting the polymer of this invention can be controlled to a given weight ratio. It is preferable in the light of prevention of deterioration due to over-oxidation or over-reduction that a structural unit having a heterocyclic compound structure is contained in 1 to 96 parts by weight to 100 parts by weight of a structural unit of a proton-conducting compound as an electrode active material. A molecular weight may be, but not limited to, about 500 to 100,000, preferably 3,000 to 80,000, more preferably 10,000 to 80,000 as a weight average molecular weight by, gel permeation chromatography (GPC). GPC can be conducted according to any of the processes described in J. Polymer Science, part B, Polymer Physics, Vol. 38, p. 1348, 2000; Chemistry Letters, p. 1049, 2000; and so on.

The number of each repeating unit in the polymer of this invention may be appropriately controlled. In the light of preventing reduction in an electron conductivity, it is desirable that the repeating units of the proton-conducting compound are consecutively aligned, and the number of the consecutive repeating units is preferably 5 or more, more preferably 10 or more. It is desirable that the number of the repeating unit of the proton-conducting compound is more than that of the repeating unit of the heterocyclic compound.

A heterocyclic compound unit in the polymer of this invention may be selected from those of heterocyclic compounds such as oxazole, thiazole, imidazole, benzimidazole, triazole, pyrazole and their derivatives. Particularly, it is desirable to select a unit of a nitrogen-containing heterocyclic compound from imidazole, benzimidazole, triazole, pyrazole and their derivatives. It is more preferable to select a unit of a nitrogen-containing heterocyclic compound from imidazole, benzimidazole and their derivatives in the light of proton conductivity.

The polymer in this invention is a polymer, which may be an oligomer compound, comprising a plurality of repeating structural units, and is a material having a function as an electrode active material by a proton-conducting compound structure in combination with an effect of preventing deterioration due to over-oxidation or over-reduction of the heterocyclic compound structure.

Furthermore, according to this invention, a chemical structure can be appropriately controlled to prevent reduction in an electron conductivity, so that a weight content of the heterocyclic compound unit can be set to a higher value, and thus the effect of preventing deterioration due to over-oxidation or over-reduction can be maximized.

To the polymer of this invention, a heterocyclic compound is chemically attached. Therefore, it has an advantage that it can cancel variation in electrode performance due to unevenness of a mixed state in comparison with an electrode in which a heterocyclic compound is simply added and mixed.

A polymer obtained according to this invention is evaluated by a product yield, an elemental analysis, an NMR analysis ($^1$H-NMR, $^{13}$C-NMR), thermogravimetric analysis (hereinafter, referred to as "TG"), GC/MS analysis and cyclic voltammetry (hereinafter, referred to as "CV"), and it is used to prepare an electrochemical cell, whose properties are evaluated. Variation in its performance and the measurement results were used as means for determining formation of the polymer. An yield of the obtained polymer was as high as 90% or more, as calculated from material concentration analysis before and after polymerization. The elemental analysis results (C, H, N ratio) and the NMR analysis results indicated that a quinoxaline structure and a heterocyclic compound structure are adequately formed. Furthermore, GC/MS analysis shows a peak implying a compound to which these compounds have been attached, indicating that these components are co-polymerized or chemically bound.

Figure 2:
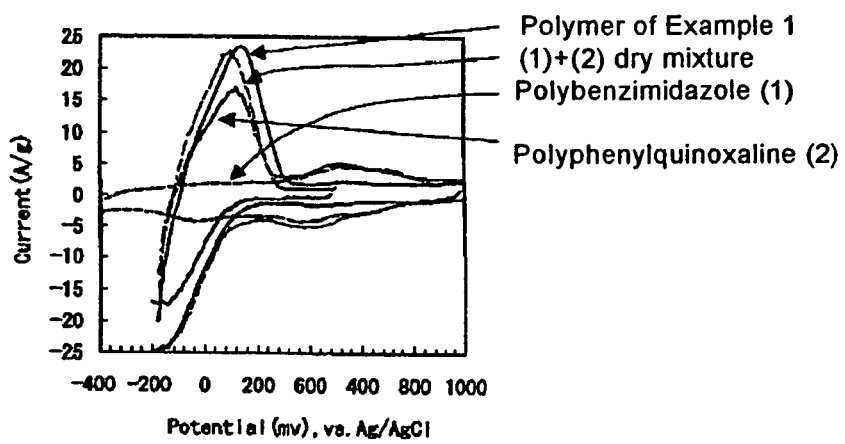
FIG. 2 is a cyclic voltammogram by CV testing.

FIG. 2 is a cyclic voltammogram by CV testing (hereinafter, referred to as a "CV diagram"). A test samples was prepared by dissolving a mixture of an electrode active material and a conduction auxiliary in m-cresol, applying the solution to a conductive substrate and drying it at 120° C. A reference electrode was an Ag/AgCl electrode while a counter electrode was Pt. A sweep rate was 20 mV/sec, and a sweep voltage range was 500 to −200 mV.

In this measurement, for example, a dry mixture of a polyphenylquinoxaline having a weight average molecular weight of 35,000 and a polybenzimidazole having a weight average molecular weight of 15,000 gave a CV diagram derived from both compounds, i.e., a superposed CV waveform of the polyphenylquinoxaline as a homopolymer and the polybenzimidazole.

On the other hand, a block copolymer having a weight average molecular weight of 50,000 in which a ratio of the polyphenylquinoxaline and the polybenzimidazole units is 70/30 by weight (the compound described in Example 1 below) shows a CV waveform in which activity derived from the polybenzimidazole observed at a potential of 400 mV or more is weakened and a CV waveform derived from the polyphenylquinoxaline observed in a potential range of 200 to −200 mV gives an increased oxidation/reduction peak current in comparison with a CV waveform of a polyphenylquinoxaline homopolymer. Thus, the CV diagram of the obtained copolymer is not identical to that of a mixture of homopolymers of the individual copolymerization components, indicating that the copolymer is produced.

Figure 3:
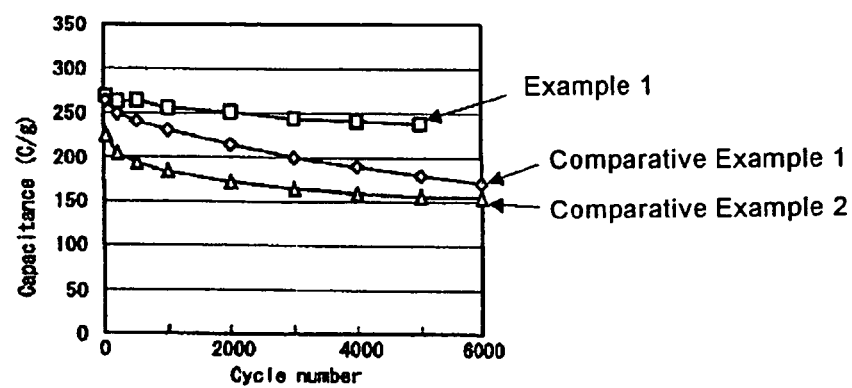
FIG. 3 shows the evaluation results for charge/discharge cycle properties by CV.

Furthermore, a homopolymer consisting of a structural unit of a proton-conducting compound (the compound described in Comparative Example 1 below), a copolymer comprising a structural unit of a proton-conducting compound and a structural unit of a benzimidazole (the compound described in Comparative Example 2 below), and a block copolymer in which a copolymerization ratio of a polyphenylquinoxaline unit and a polybenzimidazole unit is 70/30 by weight (the compound described in Example 1 below) were evaluated for their charge/discharge cycle properties by CV. A sweep rate was 1 mV/sec and a sweep potential range was 300 to −100 mV. FIG. 3 shows the evaluation results of their charge/discharge cycle properties by CV.

The results shown in FIG. 3 demonstrate that in the block copolymer of Example 1, charge/discharge cycle properties were improved without reduction in a capacity, and that performance was further improved by using the copolymer of this invention where a chemical structure was controlled.

FIG. 4 shows TG determination results for the copolymers in Examples 1 and 2 below, and as homopolymers, a polybenzimidazole (formula (22), a weight average molecular weight: 7,000) and a polyphenylquinoxaline (Comparative Example 1). The results demonstrate that the copolymer of this invention had heat resistance derived from the individual homopolymers and that as a weight content of the benzimidazole unit increased, heat resistance tended to be deteriorated, indicating influence of the benzimidazole to heat resistance. Thus, it indicated production of the copolymer.

A configuration of an electrochemical cell according to this invention and a manufacturing process therefor will be described with reference to FIG. 1.

The electrochemical cell of this invention is characterized in that an electrode comprising the above polymer of this invention as an electrode active material in an electrode material is used for both electrodes or at least one of them, and the other components may be as employed in the prior art.

The electrochemical cell of this invention is preferably a cell where only protons can act as a charge carrier in a redox reaction in association with charge/discharge; more specifically a cell comprising an electrolyte containing a proton source where only adsorption and desorption of protons in an electrode active material are involved in electron transfer in a redox reaction in association with charge/discharge.

Such an electrochemical cell may comprises a proton-conducting compound as an active material for each of a cathode and an anode, and an electrolytic solution containing a proton source as an electrolyte.

A proton-conducting compound used as an electrode active material may be selected from, but not limited to, those which can be involved in oxidation/reduction in a solution of a proton source. Thus, in addition to the polymer of this invention, the following compounds may be used; polyaniline, polythiophene, polypyrrole, polyacetylene, poly-p-phenylene, polyphenylene-vinylene, polyperinaphthalene, polyfuran, polyflurane, polythienylene, polypyridinediyl, polyisothianaphthene, polyquinoxaline, polypyridine, polypyrimidine; indole polymers such as polyindole; π-conjugated polymers such as polyaminoanthraquinone, polyimidazole and their derivatives; indole π-conjugated compound such as an indole trimer compound; quinones such as benzoquinone, naphthoquinone and anthraquinone; quinone polymers such as polyanthraquinone, polynaphthoquinone and polybenzoquinone where a quinone oxygen can be converted into a hydroxyl group by conjugation; and proton-conducting polymer prepared by copolymerizing two or more of the monomers giving the above polymers. These compounds may be doped to form a redox pair for exhibiting conductivity. These compounds are appropriately selected as a cathode and an anode active materials, taking a redox potential difference into account.

There will be described an embodiment where an indole compound represented by formula (26) (indole trimer) is used as a cathode active material and the polymer of this invention is used as an anode active material. In the formulas, each R is as defined in the above formulas.

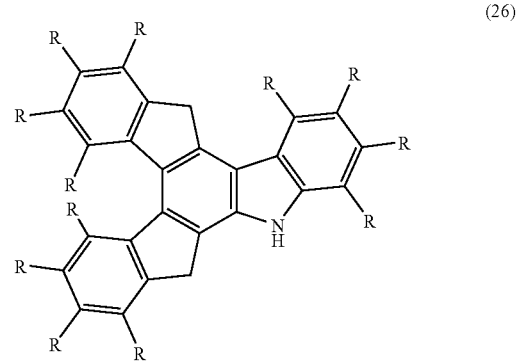

(26)

An electrode material may comprise an active material, a conduction auxiliary and if necessary a binder. A conduction auxiliary may be a carbon material; for example, carbon fiber formed by vapor growth (VGCF®, Showa Denko K. K.) and Ketjen Black as a particulate carbon. The conduction auxiliary may be contained 1 to 50 parts by weight, preferably 10 to 30 parts by weight to 100 parts by weight of the active material. The binder may be, for example, polyvinylidene fluoride (hereinafter, referred to as "PVDF"), in an amount of 1 to 20 parts by weight, preferably 5 to 10 parts by weight to the active material. The mixed powder can be pressure-formed at an ambient temperature to 300° C., preferably 100 to 250° C. to provide an electrode.

In this embodiment, a cathode was produced, using an indole trimer as a cathode active material, a vapor-growth carbon fiber as a conduction auxiliary and PVDF as a binder according to the process described above.

An anode can be produced as described above. In this embodiment, it can be produced by adding a particulate carbon, Ketjen Black, as a conduction auxiliary to the polymer of this invention as an anodic active material in an electrode material in an amount of 1 to 50 parts by weight, preferably 10 to 30 parts by weight to 100 parts by weight of the active material, and then pressure-forming the mixed powder at an ambient temperature to 400° C., preferably 200 to 350° C.

The electrolytic solution containing a proton source may be a proton-containing aqueous or non-aqueous solution. For example, when using an acid as an electrolyte, an organic or inorganic acid may be used. More specifically, organic acids which can be used include saturated monocarboxylic acids, aliphatic carboxylic acids, oxycarboxylic acids, p-toluenesulfonic acid, polyvinylsulfonic acids and lauric acid. Inorganic acids which can be uses include sulfuric acid, nitric acid, hydrochloric acid, phosphoric acid, tetrafluoroboric acid, hexafluorophosphoric acid and hexafluorosilicic acid. Among these, an acid-containing aqueous solution such as an aqueous sulfuric acid solution may be suitably used. A proton content is preferably $10^{-3}$ to 18 mol/l, more preferably $10^{-1}$ to 7 mol/l in the light of activity of an electrode reaction.

A separator 5 may be a polyolefin porous film or cation-exchanger membrane with a thickness of 10 to 50 μm. An electrochemical cell may have a basic configuration as shown in, for example, FIG. 1, where a cathode 2 comprising a proton-conducting compound as a cathodic active material and an anode 3 comprising a proton-conducting compound as an anodic active material are formed on a cathodic collector 1 and an anodic collector 4, respectively, and these electrodes are laminated via a separator 5.

The cell is filled with an aqueous or non-aqueous solution of a proton source as an electrolytic solution and is sealed by a gasket 6. The cell may have a conventional external appearance such as, but not limited to, a coin and a laminate.

EXAMPLES

This invention will be more specifically described with reference to Examples. These examples will be described with reference to FIG. 1 because the figure shows a basic structure of an electrochemical cell of these embodiments.

Example 1

A proton-conducting compound, 5-cyanoindole trimer (formula (26)), was selected as a cathodic active material; a carbon fiber (VGCF®, Showa Denko K. K.) was selected as a conduction auxiliary; PVDF(an average molecular weight: 1100) was selected as a binder. These are weighed in a weight ratio of 69/23/8 in this order, and the mixture was mixed with stirring by a blender. Then, the mixed powder was placed in a mold with a given size, and then pressure-formed at 200° C. to provide a solid electrode which was used as a cathode 2.

For forming an anode, a proton-conducting polymer compound, a polyphenylquinoxaline-polybenzimidazole block copolymer, was selected as an anodic active material; a particulate carbon black (Ketjen Black International, trade name: Ketjen Black EC600JD) was selected as a conduction auxiliary. These are weighed in a weight ratio of 75/25 in this order, and the mixture was mixed with stirring by a blender. Then, an anode 3 was formed as described for the cathode.

This block copolymer was prepared as follows. A polyphenylquinoxaline (formula (13)) having an weight average molecular weight of 35,000 and a polybenzimidazole (formula (22)) having an weight average molecular weight of 15,000 were prepared by a known polymerization process. Each of these homopolymers was dissolved in a mixed solvent of m-cresol/N,N-dimethylacetamide. After adding isophthalaldehyde, the mixture was reacted at 120° C. for 20 hours while passing the air through the solution to prepare, a block copolymer compound having a weight average molecular weight of 50,000 in which a weight ratio of polyphenylquinoxaline/polybenzimidazole was 70/30 and a polymerization unit number was 2.

An electrolytic solution was a 20 wt % aqueous sulfuric acid solution. A separator 5 was a cation-exchanger membrane with a thickness of 15 μm. The cathode and the anode were put together via the separator such that their electrode surfaces faced to each other. The laminate was packaged in a gasket 6 to give an electrochemical cell having the structure of a secondary battery shown in FIG. 1. The electrochemical cell was evaluated for its capacity and charge/discharge properties. The results are shown in Table 1.

Example 2

A polymer was prepared as follows. A polyphenylquinoxaline (formula (13)) having a weight average molecular weight of 25,000 and a polybenzimidazole (formula (22)) having a weight average molecular weight of 25,000 were prepared by a known polymerization process.

A subsequent procedure was conducted as described in Example 1, to prepare a block copolymer having a weight average molecular weight of 50,000 in which a weight ratio of polyphenylquinoxaline/polybenzimidazole was 50/50 and a polymerization unit number was 2.

An electrochemical cell was formed as described in Example 1, except that the block copolymer was used as an anodic active material, and was evaluated as described in Example 1.

Example 3

A polymer was prepared as follows. A polyphenylquinoxaline (formula (13)) having a weight average molecular weight of 25,000 was prepared by a known polymerization process. Using a solution of the homopolymer in m-cresol, a polybenzimidazole (formula (22)) was prepared by a known polymerization process to give a block copolymer having a weight average molecular weight of 50,000 in which a weight ratio of polyphenylquinoxaline/polybenzimidazole was 50/50, the polybenzimidazole was attached to both ends of the polyphenylquinoxaline and a polymerization unit number was 3. An electrochemical cell was formed as described in Example 1, except that the block copolymer was used as an anodic active material, and was evaluated as described in Example 1.

Example 4

A polymer was prepared as follows. A polyphenylquinoxaline (formula (13)) having a weight average molecular weight of 35,000 and a polybenzimidazole (formula (22)) having a weight average molecular weight of 7,500 were prepared by a known polymerization process.

A subsequent procedure was conducted as described in Example 1, to prepare a block copolymer with a polymerization unit number of 2.

To the block copolymer was attached a polybenzimidazole having a weight average molecular weight of 7,500 as described above, to prepare a block copolymer compound having a weight average molecular weight of 50,000 in which a weight ratio of polyphenylquinoxaline/polybenzimidazole was 70/30, the polybenzimidazole was attached to both ends of the polyphenylquinoxaline and a polymerization unit number was 3.

An electrochemical cell was formed as described in Example 1, except that the block copolymer was used as an anodic active material, and was evaluated as described in Example 1.

Example 5

A polymer was prepared as follows. A polyphenylquinoxaline (formula (13)) having a weight average molecular weight of 17,500 and a polybenzimidazole (formula (22)) having a weight average molecular weight of 7,500 were prepared by a known polymerization process.

Then, a block copolymer with a polymerization unit number of 2 was prepared as described in Example 1. The procedure was repeated to combine the block copolymers, giving a block copolymer compound having a weight average molecular weight of 50,000 in which a weight ratio of polyphenylquinoxaline/polybenzimidazole was 70/30, the polymerization units of the polyphenylquinoxaline and of the polybenzimidazole were alternately combined and a polymerization unit number was 4.

An electrochemical cell was formed as described in Example 1, except that the block copolymer was used as an anodic active material, and was evaluated as described in Example 1.

Example 6

A polymer was prepared as follows. A polyphenylquinoxaline (formula (13)) having a weight average molecular weight of 35,000, a polybenzimidazole (formula (22)) having a weight average molecular weight of 7,500 and a polyvinylimidazole (formula (12)) having a weight average molecular weight of 7,500 were prepared by a known polymerization process.

Then, they were reacted as described in Example 1, to provide a block copolymer compound having a weight average molecular weight of 50,000 in which a weight ratio of polyphenylquinoxaline/polybenzimidazole/polyvinylimidazole was 70/15/15, the polymerization units of the polybenzimidazole and the polyvinylimidazole were attached to the ends of the polyphenylquinoxaline polymerization unit, respectively, and a polymerization unit number was 3.

An electrochemical cell was formed as described in Example 1, except that the block copolymer was used as an anodic active material, and was evaluated as described in Example 1.

Example 8

A polymer was prepared as follows. A known polymerization process was used to prepare a polyphenylquinoxaline (formula (13)) having a repeating unit number of 30, i.e., a number average molecular weight of about 5,000 and a copolymer(formula (14)) with a weight ratio of phenylquinoxaline/benzimidazole of 70/30 having a repeating unit number of 10, i.e., a number average molecular weight of about 3,800.

These were reacted as described in Example 1, to prepare a block copolymer compound having a repeating unit number of polyphenylquinoxaline/phenylquinoxaline-benzimidazole copolymer of 30/10 and a polymerization unit number of 2, i.e., having a number average molecular weight of about 35,000 and a weight average molecular weight of 85,000.

An electrochemical cell was formed as described in Example 1, except that the block copolymer was used as an anodic active material, and was evaluated as described in Example 1.

Example 9

A polymer was prepared as described in Example 8. Specifically, a block copolymer compound having a repeating unit number of polyphenylquinoxaline/phenylquinoxaline-benzimidazole copolymer of 20/30 and a polymerization unit number of 2, i.e., having a number average molecular weight of about 13,000 and a weight average molecular weight of 42,000 was prepared.

An electrochemical cell was formed as described in Example 1, except that the block copolymer was used as an anodic active material, and was evaluated as described in Example 1.

Example 10

A polymer was prepared as follows. 3,3'-Diaminobenzidine (DABZ) and an aromatic tetracarbonyl compound derivative represented by formula (27) were prepared. These were polymerized by a known polymerization process for preparing a polyphenylquinoxaline, to prepare a polymer having a weight average molecular weight of 50,000 represented by formula (28) and comprising a repeating unit in which two benzimidazole molecules were attached as a side chain to one repeating unit of the polyphenylquinoxaline framework constituting the main chain.

An electrochemical cell was formed as described in Example 1, except that the block copolymer was used as an anodic active material, and was evaluated as described in Example 1.

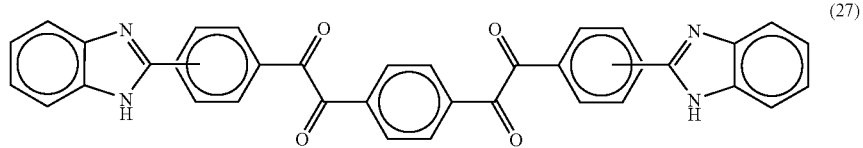

(27)

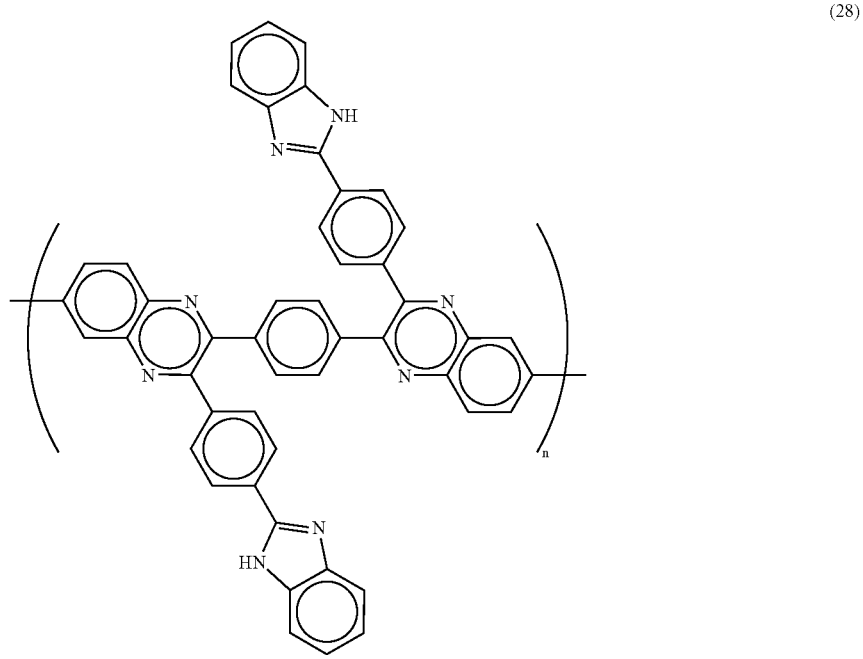

(28)

Example 11

A polymer was prepared as described in Example 10, i.e., a polymer having a weight average molecular weight of 50,000 and comprising a repeating unit in which one benzimidazole molecule was attached as a side chain to one repeating unit of the polyphenylquinoxaline framework constituting the main chain.

An electrochemical cell was formed as described in Example 1, except that the block copolymer was used as an anodic active material, and was evaluated as described in Example 1.

Example 12

A polymer was prepared as described in Example 10, i.e., a polymer having a weight average molecular weight of 50,000 and comprising a repeating unit in which in place of benzimidazole, one benzothiazole molecule was attached as a side chain to one repeating unit of the polyphenylquinoxaline framework constituting the main chain.

An electrochemical cell was formed as described in Example 1, except that the block copolymer was used as an anodic active material, and was evaluated as described in Example 1.

Example 13

A copolymer was prepared as follows. A polyphenylquinoxaline (formula (13)) having a weight average molecular weight of 20,000 and a polybenzimidazole (formula (22)) having a weight average molecular weight of 10,000 were prepared by a known polymerization process. Furthermore, a polymer having a weight average molecular weight of 20,000 was prepared as described in Example 10. The polymerization units of these polymers were reacted as described in Example 1, to prepare a polymer compound having a weight average molecular weight of 50,000, which comprised a block structure in which a weight ratio of polyphenylquinoxaline/polybenzimidazole/polymer having a side chain of benzimidazole was 40/40/20 and a polymerization unit number of 3, in combination with a benzimidazole side chain.

An electrochemical cell was formed as described in Example 1, except that the block copolymer was used as an anodic active material, and was evaluated as described in Example 1.

Comparative Example 1

Next, there will be described an electrochemical cell prepared for comparison and a polymer used therefor.

A proton-conducting compound, 5-cyanoindole trimer (formula (26)), was selected as a cathodic active material; a carbon fiber (VGCF®, Showa Denko K. K.) was selected as a conduction auxiliary; PVDF(an average molecular weight: 1100) was selected as a binder. These are weighed in a weight ratio of 69/23/8 in this order, and the mixture was mixed with stirring by a blender. Then, the mixed powder was placed in a mold with a given size, and then pressure-formed at 200° C. to provide a solid electrode as a cathode.

Next, a proton-conducting polymer compound, a polyphenylquinoxaline (formula (13)) having a weight average molecular weight of 50,000, was selected as an anodic active material; and a particulate carbon black (trade name: Ketjen Black EC600JD, Ketjen Black International) was selected as a conduction auxiliary. These are weighed in a weight ratio of 75/25 in this order, and the mixture was mixed with stirring by a blender. Then, a solid electrode as an anode was formed as described for the cathode.

An electrochemical cell was formed following the subsequent procedure described in Example 1, except that the polymer was used as an anodic active material, and was evaluated as described in Example 1.

Comparative Example 2

A copolymer prepared as described below was uses as an anodic active material. 3,3'-Diaminobenzidine (DABZ) and 1,4-bisbenzil (BBZ, a compound represented by formula (20) where $R_3$ is phenylene and $R_1$ and $R_2$ are phenyl) were subjected to condensation polymerization over a platinum catalyst in the presence of terephthalaldehyde in DMF with stirring at 80° C. for 10 hours, to prepare a copolymer represented by formula (14) having a weight average molecular weight of 50000 in which a weight ratio of phenylquinoxaline/benzimidazole was 70/30. An electrochemical cell was formed as described in Example 1 except that the polymer was used as an anodic active material, and was evaluated as described in Example 1.

Comparative Example 3

An anodic active material was a copolymer having a weight average molecular weight of 50,000 in which a weight ratio of phenylquinoxaline/benzimidazole was 50/50, prepared as described in Comparative Example 2. An electrochemical cell was formed as described in Example 1, except that the copolymer was used as an anodic active material, and was evaluated as described in Example 1.

Table 1 shows the evaluation results at 25° C. for the electrochemical cells in Examples and Comparative Examples. In the table, a capacity is a discharge capacity (mAh/g) at a charge/discharge current of 1 C. Charge/discharge cycle properties are indicated as a relative discharge capacity (%) after 5,000 cycles to an initial discharge capacity. Quick charge/discharge properties are indicated as a discharge capacity (mAh/g) at a charge/discharge current of 50 C. The conditions of a charge/discharge cycle were CCCV charging at a charge current of 5 C, 1.2 V for 10 min; CC discharging at 1C; and a terminal voltage of 0.8 V.

TABLE 1

|  |  | Capacity [mAh/g] | Charge/discharge properties [%] | Quick charge/discharge properties [mA/g] |
|---|---|---|---|---|
| Example | 1 | 75.6 | 94.7 | 65.3 |
|  | 2 | 63.9 | 96.8 | 44.4 |
|  | 3 | 63.7 | 96.1 | 45.1 |
|  | 4 | 75.8 | 95.0 | 66.1 |
|  | 5 | 72.5 | 96.7 | 58.3 |
|  | 6 | 75.0 | 94.1 | 64.7 |
|  | 8 | 72.2 | 95.2 | 58.3 |
|  | 9 | 66.7 | 93.0 | 44.4 |
|  | 10 | 80.6 | 96.8 | 69.4 |
|  | 11 | 75.0 | 92.3 | 65.3 |
|  | 12 | 73.6 | 91.8 | 61.1 |
|  | 13 | 76.4 | 95.5 | 66.7 |
| Comparative Example | 1 | 73.6 | 72.5 | 61.1 |
|  | 2 | 56.9 | 91.3 | 38.9 |
|  | 3 | 33.3 | 85.4 | 16.7 |

As seen from the evaluation results in Table 1, all of Examples showed a larger capacity than Comparative 2 or 3; particularly, an increase by 30 mAh/g or more compared with Comparative Example 3. It is shown that some of examples have a capacity comparable to or higher than that of Comparative Example 1 without copolymerization with a heterocyclic compound.

As seen from the evaluation results for charge/discharge cycle properties shown in Table 1, all of Examples show improvement by about 20% or more in comparison with Comparative Example 1 without copolymerization with a heterocyclic compound and Comparative Example 2 or 3 with copolymerization, particularly by about 10% or more in comparison with Comparative Example 3.

Furthermore, as seen from the evaluation results for quick charge/discharge properties in Table 1, all of Examples show a higher capacity than Comparative Example 2 or 3 with copolymerization, particularly by about 30 mAh/g or more in comparison with Comparable Example 3. It is shown that some of Examples have a capacity comparable to or higher than Comparative Example 1 without copolymerization with a heterocyclic compound.

The above results demonstrate that this invention can improve charge/discharge cycle properties of a secondary battery without deteriorating an apparent capacity or quick charge/discharge properties.

It is because the polymer of this invention used as an electrode active material in an electrode material has a structure with a controlled chemical structure so that even when a content of the heterocyclic compound is considerably increased, an electron conductivity of the proton-conducting compound acting as an electrode active material is not deteriorated, but satisfactorily maintained. Thus, according to this invention, an electron conductivity is not deteriorated, so that reduction in an apparent capacity and deterioration in quick charge/discharge properties can be prevented. Furthermore, since a content of a heterocyclic compound structure capable of preventing deterioration of a material due to over-oxidation or over-reduction can be increased, charge/discharge cycle properties can be further improved.

Therefore, the polymer of this invention can be used to prevent an internal resistance of an electrochemical cell from being increased and to achieve good charge/discharge cycle properties without deterioration in an apparent capacity or quick charge/discharge properties.

Although this invention has been described in terms of a secondary battery, this invention may be applied to another type of electrochemical cell with comparable effects.

What is claimed is:

1. A polymer having a chain structure of a repeating unit of a proton-conducting compound which causes an electrochemical redox reaction in a solution of a proton source to act as an electrode active material, and a heterocyclic compound structure,
wherein the chain structure of the proton-conducting compound has a quinoxaline structure represented by formula (1):

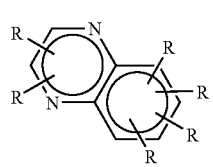

(1)

wherein at least one of Rs is a group attached to the main chain or a side chain of the polymer, or two of Rs are groups constituting the main chain, and the other Rs are independently selected from the group consisting of hydrogen, hydroxyl, amino, carboxyl, nitro, phenyl, vinyl, halogen, acyl, cyano, trifluoromethyl, alkoxyl, sulfonic, trifluoromethylthio, carboxylate, sulfonate, $C_1$ to $C_{20}$ alkyl optionally substituted with one or more of the above substituents, $C_2$ to $C_{20}$ alkenyl optionally substituted with one or more of the above substituents, $C_6$ to $C_{20}$ aryl optionally substituted with one or more of the above substituents, $C_1$ to $C_{20}$ alkylthio optionally substituted with one or more of the above substituents and a heterocyclic compound residue.

2. A polymer having a chain structure of a repeating unit of a proton-conducting compound which causes an electrochemical redox reaction in a solution of a proton source to act as an electrode active material, and a heterocyclic compound structure,
wherein the polymer has, as the chain structure of the proton-conducting compound, a chain of a quinoxaline structural unit represented by formula (1A):

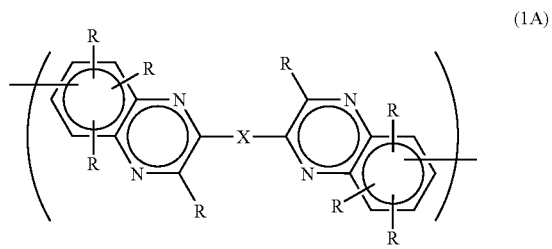

(1A)

wherein Rs independently represent hydrogen, hydroxyl, amino, carboxyl, nitro, phenyl, vinyl, halogen, acyl, cyano, trifluoromethyl, alkoxyl, sulfonic, trifluoromethylthio, carboxylate, sulfonate, $C_1$ to $C_{20}$ alkyl optionally substituted with one or more of the above substituents, $C_2$ to $C_{20}$ alkenyl optionally substituted with one or more of the above substituents, $C_6$ to $C_{20}$ aryl optionally substituted with one or more of the above substituents, $C_1$ to $C_{20}$ alkylthio optionally substituted with one or more of the above substituents and a heterocyclic compound residue; and X represents arylene optionally substituted with one or more of the above substituents.

3. The polymer as claimed in claim 2, wherein the polymer is a block copolymer having a polymer unit of the proton-conducting compound and a polymer unit of the heterocyclic compound.

4. The polymer as claimed in claim 2, wherein the polymer comprises a main polymer having a polymer unit of the proton-conducting compound and the heterocyclic compound attached to the main polymer or a side chain comprising the heterocyclic compound structure.

5. The polymer as claimed in claim 3, wherein the polymer comprises a main polymer consisting of the block copolymer and the heterocyclic compound attached to the main polymer or a side chain comprising the heterocyclic compound structure.

6. The polymer as claimed in claim 2, wherein the polymer comprises a polymer unit having a chain structure of the proton-conducting compound, and a copolymer unit having the proton-conducting compound structure and the heterocyclic compound structure.

7. The polymer as claimed in claim 3, wherein a number average molecular weight of the polymer unit of the proton-conducting compound is larger than a number average molecular weight of the polymer unit of the heterocyclic compound.

8. The polymer as claimed in claim 2, wherein a content ratio by weight of the structural unit of the heterocyclic compound is 1 to 95 parts by weight to 100 parts by weight of the structural unit of the proton-conducting compound.

9. The polymer as claimed in claim 2, having, as the heterocyclic compound structure, a structure of a compound represented by formula (2) or (3):

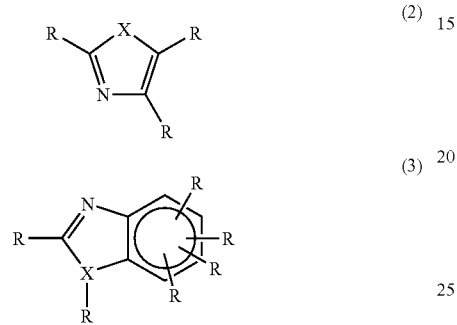

wherein at least one of Rs is a group attached to the main chain or a side chain of the polymer, or two of Rs are groups constituting the main chain, and the other Rs are independently selected from the group consisting of hydrogen, hydroxyl, amino, carboxyl, nitro, phenyl, vinyl, halogen, acyl, cyano, trifluoromethyl, alkoxyl, sulfonic, trifluoromethylthio, carboxylate, sulfonate, $C_1$ to $C_{20}$ alkyl optionally substituted with one or more of the above substituents, $C_2$ to $C_{20}$ alkenyl optionally substituted with one or more of the above substituents, $C_6$ to $C_{20}$ aryl optionally substituted with one or more of the above substituents, $C_1$ to $C_{20}$ alkylthio optionally substituted with one or more of the above substituents and a heterocyclic compound residue; and X is a heteroatom selected from the group consisting of nitrogen, sulfur and oxygen.

10. The polymer as claimed in claim 2, wherein the heterocyclic compound structure is a structure of at least one compound selected from the group consisting of an imidazole represented by formula (4), a triazole represented by formula (5) or (6) and a pyrazole represented by formula (7):

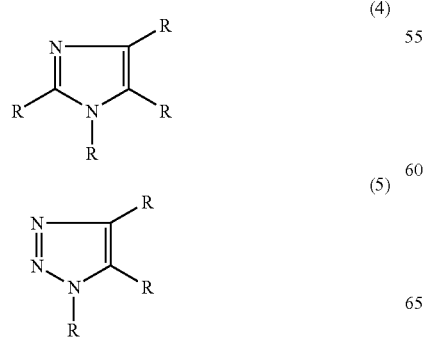

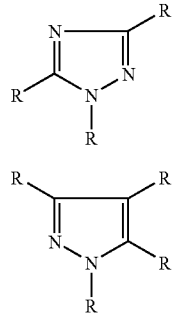

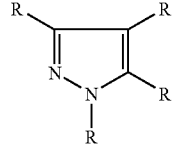

wherein at least one of Rs is a group attached to the main chain or a side chain of the polymer, or two of Rs are groups constituting the main chain, and the other Rs are independently selected from the group consisting of hydrogen, hydroxyl, amino, carboxyl, nitro, phenyl, vinyl, halogen, acyl, cyano, trifluoromethyl, alkoxyl, sulfonic, trifluoromethylthio, carboxylate, sulfonate, $C_1$ to $C_{20}$ alkyl optionally substituted with one or more of the above substituents, $C_2$ to $C_{20}$ alkenyl optionally substituted with one or more of the above substituents, $C_6$ to $C_{20}$ aryl optionally substituted with one or more of the above substituents, $C_1$ to $C_{20}$ alkylthio optionally substituted with one or more of the above substituents and a heterocyclic compound residue.

11. The polymer as claimed in claim 2, wherein the heterocyclic compound structure is at least one selected from the group consisting of a unit having a benzimidazole moiety represented by formula (8), (9) or (10), a unit having a benzbisimidazole moiety represented by formula (11), and a unit having a vinylimidazole moiety represented by formula (12) or its derivative.

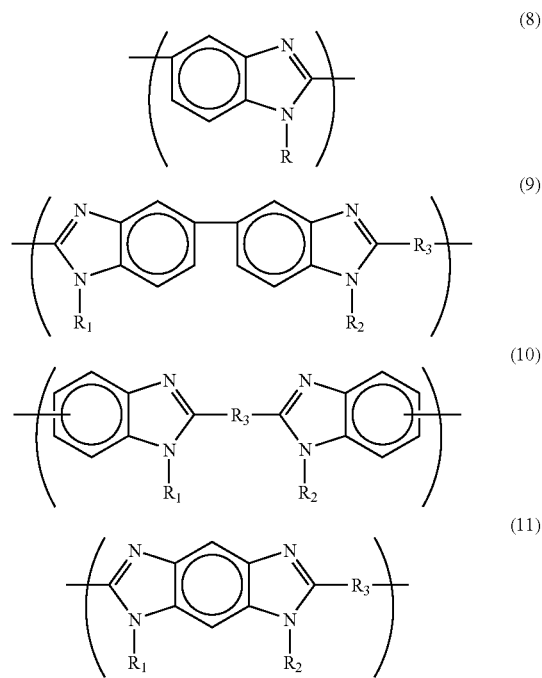

-continued

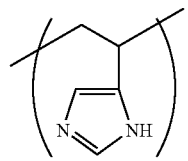

(12)

wherein R, R₁ and R₂ independently represent hydrogen, hydroxyl, amino, carboxyl, nitro, phenyl, vinyl, halogen, acyl, cyano, trifluoromethyl, alkoxyl, sulfonic, trifluoromethylthio, carboxylate, sulfonate, $C_1$ to $C_{20}$ alkyl optionally substituted with one or more of the above substituents, $C_2$ to $C_{20}$ alkenyl optionally substituted with one or more of the above substituents, $C_6$ to $C_{20}$ aryl optionally substituted with one or more of the above substituents, $C_1$ to $C_{20}$ alkylthio optionally substituted with one or more of the above substituents and a heterocyclic compound residue; and R₃ represents an arylene optionally substituted with one or more of the above substituents.

12. An electrode comprising the polymer as claimed in claim 2 as an electrode active material.

13. An electrochemical cell comprising the polymer as claimed in claim 2 as an electrode active material.

14. The electrochemical cell as claimed in claim 13 comprising an electrolyte containing a proton source, wherein only protons act as a charge carrier in a redox reaction in association with charge/discharge.

15. A polymer of two different constituent repeating units consisting of first and second repeating units, said first repeating unit being a proton-conducting compound having a quinoxaline structure unit represented by formula (1A) capable of causing an electro chemical redox reaction in a solution of a proton source as an electrode active material,

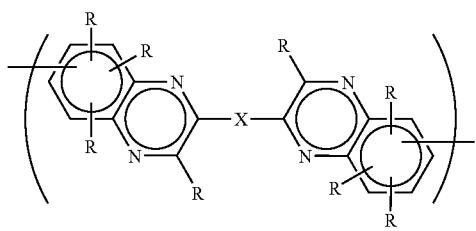

(1A)

wherein Rs independently represent hydrogen, hydroxyl, amino, carboxyl, nitro, phenyl, vinyl, halogen, acyl, cyano, trifluoromethyl, alkoxyl, sulfonic, trifluoromethylthio, carboxylate, sulfonate, $C_1$ to $C_{20}$ alkyl optionally substituted with one or more of the above substituents, $C_2$ to $C_{20}$ alkenyl optionally substituted with one or more of the above substituents, $C_6$ to $C_{20}$ aryl optionally substituted with one or more of the above substituents, $C_1$ to $C_{20}$ alkylthio optionally substituted with one or more of the above substituents and a heterocyclic compound residue; and X represents arylene optionally substituted with one or more of the above substituents, said second repeating unit being a heterocyclic compound.

16. The polymer as claimed in claim 15, wherein the polymer is a copolymer of the first and second constituent repeating units.

17. The polymer as claimed in claim 16, wherein the copolymer is a block copolymer.

18. The polymer as claimed in claim 15 wherein the heterocyclic compound has a structure represented by formula (2) or (3):

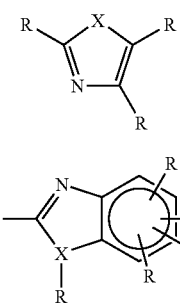

(2)

(3)

wherein at least one of Rs is a group attached to the main chain or a side chain of the polymer, or two of Rs are groups constituting the main chain, and the other Rs are independently selected from the group consisting of hydrogen, hydroxyl, amino, carboxyl, nitro, phenyl, vinyl, halogen, acyl, cyano, trifluoromethyl, alkoxyl, sulfonic, trifluoromethylthio, carboxylate, sulfonate, $C_1$ to $C_{20}$ alkyl optionally substituted with one or more of the above substituents, $C_2$ to $C_{20}$ alkenyl optionally substituted with one or more of the above substituents, $C_6$ to $C_{20}$ aryl optionally substituted with one or more of the above substituents, $C_1$ to $C_{20}$ alkylthio optionally substituted with one or more of the above substituents and a heterocyclic compound residue; and X is a heteroatom selected from the group consisting of nitrogen, sulfur and oxygen.

19. The polymer as claimed in claim 15, wherein the heterocyclic compound has a structure of at least one compound selected from the group consisting of an imidazole represented by formula (4), a triazole represented by formula (5) or (6) and a pyrazole represented by formula (7):

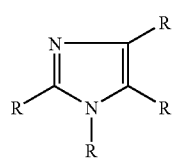

(4)

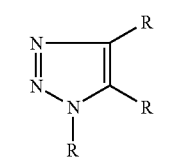

(5)

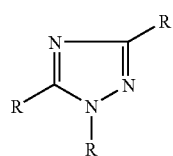

(6)

-continued

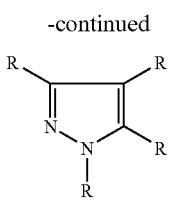
(7)

wherein at least one of Rs is a group attached to the main chain or a side chain of the polymer, or two of Rs are groups constituting the main chain, and the other Rs are independently selected from the group consisting of hydrogen, hydroxyl, amino, carboxyl, nitro, phenyl, vinyl, halogen, acyl, cyano, trifluoromethyl, alkoxyl, sulfonic, trifluoromethylthio, carboxylate, sulfonate, $C_1$ to $C_{20}$ alkyl optionally substituted with one or more of the above substituents, $C_2$ to $C_{20}$ alkenyl optionally substituted with one or more of the above substituents, $C_6$ to $C_{20}$ aryl optionally substituted with one or more of the above substituents, $C_1$ to $C_{20}$ alkylthio optionally substituted with one or more of the above substituents and a heterocyclic compound residue.

20. The polymer as claimed in claim 15, wherein the heterocyclic compound has a structure at least one selected from the group consisting of a unit having a benzimidazole moiety represented by formula (8), (9) or (10), a unit having a benzbisimidazole moiety represented by formula (11), and a unit having a vinylimidazole moiety represented by formula (12) or its derivative,

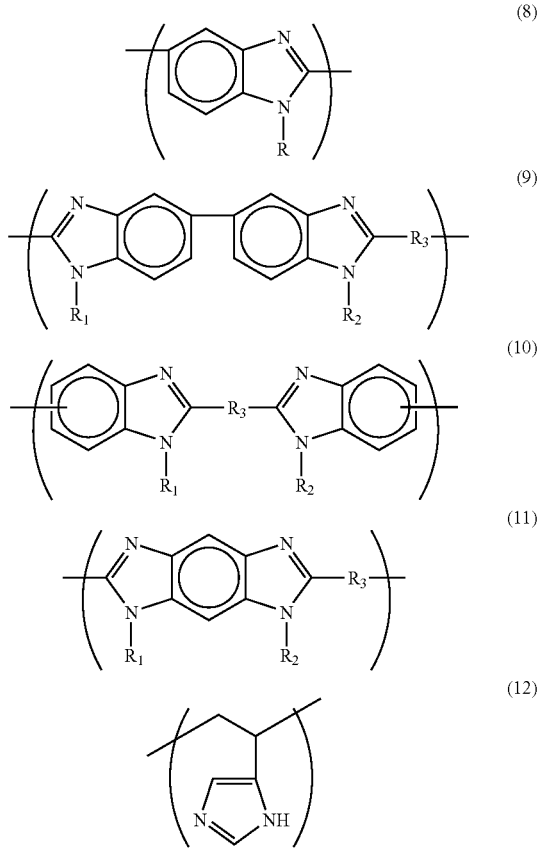

wherein R, $R_1$ and $R_2$ independently represent hydrogen, hydroxyl, amino, carboxyl, nitro, phenyl, vinyl, halogen, acyl, cyano, trifluoromethyl, alkoxyl, sulfonic, trifluoromethylthio, carboxylate, sulfonate, $C_1$ to $C_{20}$ alkyl optionally substituted with one or more of the above substituents, $C_2$ to $C_{20}$ alkenyl optionally substituted with one or more of the above substituents, $C_6$ to $C_{20}$ aryl optionally substituted with one or more of the above substituents, $C_1$ to $C_{20}$ alkylthio optionally substituted with one or more of the above substituents and a heterocyclic compound residue; and $R_3$ represents an arylene optionally substituted with one or more of the above substituents.

21. The polymer as claimed in claim 15, wherein the polymer comprises the second repeating unit in an amount of 1 to 95 parts by weight per 100 parts by weight of the first repeating unit.

22. The polymer as claimed in claim 1, wherein the polymer is a block copolymer having a polymer unit of the proton-conducting compound and a polymer unit of the heterocyclic compound.

23. The polymer as claimed in claim 1, wherein the polymer comprises a main polymer having a polymer unit of the proton-conducting compound and the heterocyclic compound attached to the main polymer or a side chain comprising the heterocyclic compound structure.

24. The polymer as claimed in claim 22, wherein the polymer comprises a main polymer consisting of the block copolymer and the heterocyclic compound attached to the main polymer or a side chain comprising the heterocyclic compound structure.

25. The polymer as claimed in claim 1, wherein the polymer comprises a polymer unit having a chain structure of the proton-conducting compound, and a copolymer unit having the proton-conducting compound structure and the heterocyclic compound structure.

26. The polymer as claimed in claim 22, wherein a number average molecular weight of the polymer unit of the proton-conducting compound is larger than a number average molecular weight of the polymer unit of the heterocyclic compound.

27. The polymer as claimed in claim 1, wherein a content ratio by weight of the structural unit of the heterocyclic compound is 1 to 95 parts by weight to 100 parts by weight of the structural unit of the proton-conducting compound.

28. The polymer as claimed in claim 1, having, as the heterocyclic compound structure, a structure of a compound represented by formula (2) or (3):

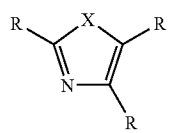
(2)

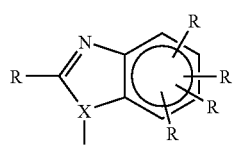
(3)

wherein at least one of Rs is a group attached to the main chain or a side chain of the polymer, or two of Rs are groups constituting the main chain, and the other Rs are independently selected from the group consisting of hydrogen, hydroxyl, amino, carboxyl, nitro, phenyl, vinyl, halogen, acyl, cyano, trifluoromethyl, alkoxyl, sulfonic, trifluoromethylthio, carboxylate, sulfonate, $C_1$ to $C_{20}$ alkyl optionally substituted with one or more of the above substituents, $C_2$ to $C_{20}$ alkenyl optionally substituted with one or more of the above substituents, $C_6$ to $C_{20}$ aryl optionally substituted with one or more of the above substituents, $C_1$ to $C_{20}$ alkylthio optionally substituted with one or more of the above substituents and a heterocyclic compound residue; and X is a heteroatom selected from the group consisting of nitrogen, sulfur and oxygen.

29. The polymer as claimed in claim 1, wherein the heterocyclic compound structure is a structure of at least one compound selected from the group consisting of an imidazole represented by formula (4), a triazole represented by formula (5) or (6) and a pyrazole represented by formula (7):

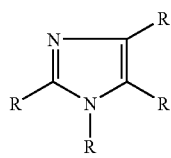

(4)

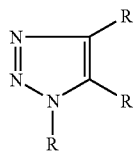

(5)

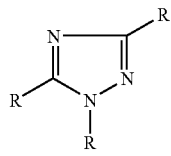

(6)

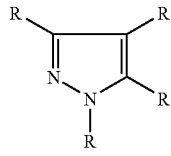

(7)

wherein at least one of Rs is a group attached to the main chain or a side chain of the polymer, or two of Rs are groups constituting the main chain, and the other Rs are independently selected from the group consisting of hydrogen, hydroxyl, amino, carboxyl, nitro, phenyl, vinyl, halogen, acyl, cyano, trifluoromethyl, alkoxyl, sulfonic, trifluoromethylthio, carboxylate, sulfonate, $C_1$ to $C_{20}$ alkyl optionally substituted with one or more of the above substituents, $C_2$ to $C_{20}$ alkenyl optionally substituted with one or more of the above substituents, $C_6$ to $C_{20}$ aryl optionally substituted with one or more of the above substituents, $C_1$ to $C_{20}$ alkylthio optionally substituted with one or more of the above substituents and a heterocyclic compound residue.

30. The polymer as claimed in claim 1, wherein the heterocyclic compound structure is at least one selected from the group consisting of a unit having a benzimidazole moiety represented by formula (8), (9) or (10), a unit having a benzbisimidazole moiety represented by formula (11), and a unit having a vinylimidazole moiety represented by formula (12) or its derivative,

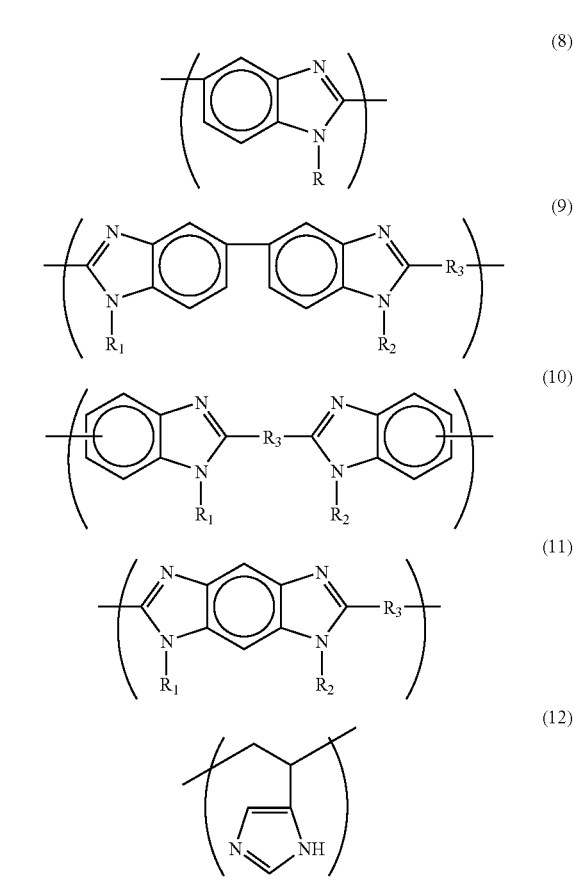

wherein R, $R_1$ and $R_2$ independently represent hydrogen, hydroxyl, amino, carboxyl, nitro, phenyl, vinyl, halogen, acyl, cyano, trifluoromethyl, alkoxyl, sulfonic, trifluoromethylthio, carboxylate, sulfonate, $C_1$ to $C_{20}$ alkyl optionally substituted with one or more of the above substituents, $C_2$ to $C_{20}$ alkenyl optionally substituted with one or more of the above substituents, $C_6$ to $C_{20}$ aryl optionally substituted with one or more of the above substituents, $C_1$ to $C_{20}$ alkylthio optionally substituted with one or more of the above substituents and a hetero cyclic compound residue; and $R_3$ represents an arylene optionally substituted with one or more of the above substituents.

31. An electrode comprising the polymer as claimed in claim 1 as an electrode active material.

32. An electrochemical cell comprising the polymer as claimed in claim 1 as an electrode active material.

33. The electrochemical cell as claimed in claim 32 comprising an electrolyte containing a proton source, wherein only protons act as a charge carrier in a redox reaction in association with charge/discharge.

* * * * *

UNITED STATES PATENT AND TRADEMARK OFFICE
CERTIFICATE OF CORRECTION

PATENT NO.       : 7,230,069 B2
APPLICATION NO.  : 11/042900
DATED            : June 12, 2007
INVENTOR(S)      : Tomoki Nobuta et al.

It is certified that error appears in the above-identified patent and that said Letters Patent is hereby corrected as shown below:

Column 2/line 41, delete "polytetrafluoroethyele," and insert --polytetrafluoroethylene,--, therefor.

Column 8/line 14, delete "derivative." and insert --derivative:--, therefor.

Column 9/line 15-16, delete "Caboxylate" and insert --Carboxylate--, therefor.

Column 18/line 3-16, delete " 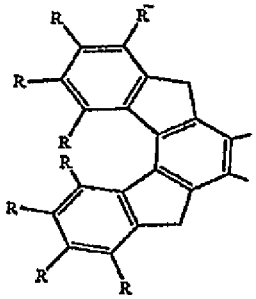 " and insert -- 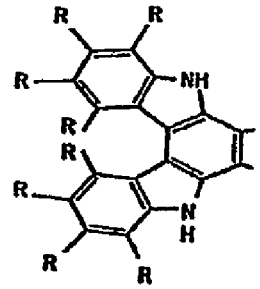 -- therefor.

Column 28/line 39, Claim 11, delete "derivative." and insert --derivative:--, therefor.

Column 29/line 37, Claim 15, delete "electro chemical" and insert --electrochemical--, therefor.

Column 31/line 31, Claim 20, delete "derivative." and insert --derivative:--, therefor.

Column 34/line 3, Claim 30, delete "derivative." and insert --derivative:--, therefor.

UNITED STATES PATENT AND TRADEMARK OFFICE
CERTIFICATE OF CORRECTION

PATENT NO.        : 7,230,069 B2
APPLICATION NO.   : 11/042900
DATED             : June 12, 2007
INVENTOR(S)       : Tomoki Nobuta et al.

It is certified that error appears in the above-identified patent and that said Letters Patent is hereby corrected as shown below:

Column 34/line 50, Claim 30, delete "hetero cyclic" and insert --heterocyclic--, therefor.

Signed and Sealed this

Twentieth Day of November, 2007

JON W. DUDAS
*Director of the United States Patent and Trademark Office*